United States Patent
Chester et al.

(10) Patent No.: US 8,394,290 B2
(45) Date of Patent: Mar. 12, 2013

(54) RECOVERY OF ALUMINA TRIHYDRATE DURING THE BAYER PROCESS USING SCLEROGLUCAN

(75) Inventors: Ryan Chester, Heathridge (AU); John D. Kildea, Baldivis (AU); Jing Wang, Aurora, IL (US); Heinrich E. Bode, Aurora, IL (US); Xiaojin Harry Li, Palatine, IL (US)

(73) Assignee: Nalco Company, Naperville, IL (US)

( * ) Notice: Subject to any disclaimer, the term of this patent is extended or adjusted under 35 U.S.C. 154(b) by 0 days.

(21) Appl. No.: 13/586,025

(22) Filed: Aug. 15, 2012

(65) Prior Publication Data

US 2012/0305837 A1 Dec. 6, 2012

Related U.S. Application Data

(62) Division of application No. 12/852,917, filed on Aug. 9, 2010, now Pat. No. 8,252,266.

(51) Int. Cl.
- *C02F 5/08* (2006.01)
- *C02F 5/02* (2006.01)
- *C02F 5/10* (2006.01)
- *C09K 3/00* (2006.01)
- *B03D 1/001* (2006.01)

(52) U.S. Cl. .............................. 252/180; 252/1; 252/60

(58) Field of Classification Search .............. 252/1, 60, 252/61, 175, 180; 210/702, 705, 723, 730; 423/122, 625
See application file for complete search history.

(56) References Cited

U.S. PATENT DOCUMENTS

| | | | | |
|---|---|---|---|---|
| 5,008,089 A | * | 4/1991 | Moody et al. | 423/121 |
| 2006/0272816 A1 | * | 12/2006 | Willberg et al. | 166/279 |

* cited by examiner

*Primary Examiner* — Steven Bos
*Assistant Examiner* — Justin Bova
(74) *Attorney, Agent, or Firm* — Calfree, Halter & Griswold, LLP

(57) ABSTRACT

The invention provides methods and compositions for improving the production of alumina. The invention involves adding a product containing one or more polysaccharides to liquor within the fluid circuit of the production process, where one of the polysaccharides is scleroglucan. The use of scleroglucan can impart a number of advantages including at least some of: greater flocculation effectiveness, increasing the maximum effective dosage, faster settling rate. The production process can be a Bayer process.

10 Claims, No Drawings

RECOVERY OF ALUMINA TRIHYDRATE DURING THE BAYER PROCESS USING SCLEROGLUCAN

CROSS-REFERENCE TO RELATED APPLICATIONS

This application is a divisional application of U.S. patent Ser. No. 12/852,917, filed Aug. 9, 2010, issued as U.S. Pat. No. 8,252,266, the disclosure of which is herein incorporated by reference.

STATEMENT REGARDING FEDERALLY SPONSORED RESEARCH OR DEVELOPMENT

Not Applicable.

BACKGROUND OF THE INVENTION

The invention relates to a method for improving the Bayer process for the production of alumina from bauxite ore. The invention concerns the use of scleroglucan to improve the performance of unit operations within the Bayer process, specifically to enhance the settling of fine alumina trihydrate crystals.

In the typical Bayer process for the production of alumina trihydrate, bauxite ore is pulverized, slurried with caustic solution, and then digested at elevated temperatures and pressures. The caustic solution dissolves oxides of aluminum, forming an aqueous sodium aluminate solution. The caustic-insoluble constituents of bauxite ore are then separated from the aqueous phase containing the dissolved sodium aluminate. Solid alumina trihydrate product is precipitated out of the solution and collected as product.

As described at least in part, among other places, in U.S. Pat. No. 6,814,873, the Bayer process is constantly evolving and the specific techniques employed in industry for the various steps of the process not only vary from plant to plant, but also are often held as trade secrets. As a more detailed, but not comprehensive, example of a Bayer process, the pulverized bauxite ore may be fed to a slurry mixer where aqueous slurry is prepared. The slurry makeup solution is typically spent liquor (described below) and added caustic solution. This bauxite ore slurry is then passed through a digester or a series of digesters where the available alumina is released from the ore as caustic-soluble sodium aluminate. The digested slurry is then cooled, for instance to about 220° F., employing a series of flash tanks wherein heat and condensate are recovered. The aluminate liquor leaving the flashing operation contains insoluble solids, which solids consist of the insoluble residue that remains after, or are precipitated during, digestion. The coarser solid particles may be removed from the aluminate liquor with a "sand trap", cyclone or other means. The finer solid particles may be separated from the liquor first by settling and then by filtration, if necessary.

The clarified sodium aluminate liquor is then further cooled and seeded with alumina trihydrate crystals to induce precipitation of alumina in the form of alumina trihydrate, $Al(OH)_3$. The alumina trihydrate particles or crystals are then classified into various size fractions and separated from the caustic liquor. The remaining liquid phase, the spent liquor, is returned to the initial digestion step and employed as a digestant after reconstitution with caustic.

Within the overall process one of the key steps is that of precipitation of the alumina trihydrate from the clarified sodium aluminate liquor. After the insoluble solids are removed to give the clarified sodium aluminate liquor, also referred to as "green liquor", it is generally charged to a suitable precipitation tank, or series of precipitation tanks, and seeded with recirculated fine alumina trihydrate crystals. In the precipitation tank(s) it is cooled under agitation to induce the precipitation of alumina from solution as alumina trihydrate. The fine particle alumina trihydrate acts as seed crystals which provide nucleation sites and agglomerate together and grow as part of this precipitation process.

Alumina trihydrate crystal formation (the nucleation, agglomeration and growth of alumina trihydrate crystals), and the precipitation and collection thereof, are critical steps in the economic recovery of aluminum values by the Bayer process. Bayer process operators strive to optimize their crystal formation and precipitation methods so as to produce the greatest possible product yield from the Bayer process while producing crystals of a given particle size distribution. A relatively large particle size is beneficial to subsequent processing steps required to recover aluminum metal. Undersized alumina trihydrate crystals, or fines, generally are not used in the production of aluminum metal, but instead are recycled for use as fine particle alumina trihydrate crystal seed. As a consequence, the particle size of the precipitated trihydrate crystals determines whether the material is to be ultimately utilized as product (larger crystals) of as seed (smaller crystals). The classification and capture of the different sized trihydrate particles is therefore an important step in the Bayer process.

This separation or recovery of alumina trihydrate crystals as product in the Bayer process, or for use as precipitation seed, is generally achieved by settling, cyclones, filtration and/or a combination of these techniques. Coarse particles settle easily, but fine particles settle slowly. Typically, plants will use two or three steps of settling in order to classify the trihydrate particles into different size distributions corresponding to product and seed. In particular, in the final step of classification a settling vessel is often used to capture and settle the fine seed particles. Within the settling steps of the classification system, flocculants can be used to enhance particle capture and settling rate.

The overflow of the last classification stage is returned to the process as spent liquor. This spent liquor will go through heat exchangers and evaporation and eventually be used back in digestion. As a result, any trihydrate particles reporting to the overflow in this final settling stage will not be utilized within the process for either seed or product. Effectively such material is recirculated within the process, creating inefficiencies. Therefore, it is important to achieve the lowest possible concentration of solids in the overflow of the last stage of classification to maximize the efficiency of the process.

As described for example in U.S. Pat. No. 5,041,269, conventional technology employs the addition of synthetic water soluble polyacrylate flocculants and/or dextran flocculants to improve the settling characteristics of the alumina trihydrate particles in the classification process and reduce the amount of solids in the spent liquor. While various flocculants are often used in the trihydrate classification systems of Bayer plants, it is highly desirable to reduce as far as possible, the loss of solids with the spent liquor.

Thus there is clear need and utility for a method of improving the classification and flocculation of precipitated alumina trihydrate in the Bayer process. Such improvements would enhance the efficiency of the production of alumina from bauxite ore.

The art described in this section is not intended to constitute an admission that any patent, publication or other information referred to herein is "prior art" with respect to this invention, unless specifically designated as such. In addition, this section should not be construed to mean that a search has been made or that no other pertinent information as defined in 37 CFR §1.56(a) exists.

BRIEF SUMMARY OF THE INVENTION

At least one embodiment of the invention is directed towards a method for settling alumina trihydrate in the Bayer process. The process comprises adding to the system an effective amount of scleroglucan. The use of such a scleroglucan results in improved settling of alumina trihydrate when compared to the use of conventional flocculants employed in this process.

At least one embodiment of the invention is directed towards a method for producing alumina comprising the addition of a composition containing one or more polysaccharides, one of which is scleroglucan to liquor of a Bayer process fluid stream. The composition may be added to said liquor in a trihydrate classification circuit of said alumina production process. The composition may be added to said liquor at one or more locations in said process where solid-liquid separation occurs. The addition locations may facilitate inhibiting the rate of nucleation of one or more alumina trihydrate crystals in said process. The addition location may facilitate reducing the rate of scale formation in said process. The composition may improve the yield of alumina trihydrate sequestration.

At least one embodiment of the invention is directed towards a composition comprising scleroglucan and Bayer liquor.

DETAILED DESCRIPTION OF THE INVENTION

For purposes of this application the definition of these terms is as follows:

"Scleroglucan" is a polysaccharide consisting of beta-1,3-D-glucose residues with one beta-1,6-D-glucose side chain every three main residues "Liquor" or "Bayer liquor" is liquid medium that has run through a Bayer process in an industrial facility.

In the event that the above definitions or a description stated elsewhere in this application is inconsistent with a meaning (explicit or implicit) which is commonly used, in a dictionary, or stated in a source incorporated by reference into this application, the application and the claim terms in particular are understood to be construed according to the definition or description in this application, and not according to the common definition, dictionary definition, or the definition that was incorporated by reference. In light of the above, in the event that a term can only be understood if it is construed by a dictionary, if the term is defined by the *Kirk-Othmer Encyclopedia of Chemical Technology*, 5th Edition, (2005), (Published by Wiley, John & Sons, Inc.) this definition shall control how the term is to be defined in the claims.

In at least one embodiment, a process for extracting alumina trihydrate comprises the digestion of pretreated bauxite ore in an alkaline liquor to produce a slurry of red mud solids and aluminate in suspension in the alkaline liquor then decanting the red mud solids from the alkaline liquor suspension to produce the decanting liquor; the passing of said decanting liquor through security filtration to remove all solids, precipitation and production of a slurry containing alumina trihydrate solids which then are flocculated and settled with the addition of a polysaccharide. Larger trihydrate particles are put through the calcination process to produce purified alumina while finer particles are re-used as seed for the precipitation process.

In at least one embodiment the preferred flocculant of the trihydrate solids in the process is scleroglucan or a blend of scleroglucan with one or more other polysaccharides such as dextran. The flocculant is added in the range of 0.1 to 100 ppm. The most preferred dose range for the flocculant is 0.1 to 10 ppm.

As described at least in U.S. Pat. Nos. 6,726,845, 3,085,853, 5,008,089, 5,041,269, 5,091,159, 5,106,599, 5,346,628 and 5,716,530 and Australian Patents 5310690 and 737191, polysaccharides such as dextran have previously been used in the Bayer Process. However, use of scleroglucan results in superior and unexpected improvements in the activity when compared to conventional polysaccharides or other reagents.

In at least one embodiment the composition is added to liquor in a trihydrate classification circuit of said alumina trihydrate production process. The composition can be added to said liquor at one or more locations in a Bayer process where solid-liquid separation occurs.

In at least one embodiment the composition can be added to said liquor at one or more locations in a Bayer process where it inhibits the rate of nucleation of one or more alumina hydrate crystals in said process.

In at least one embodiment the composition can be added to said liquor at one or more locations in a Bayer process where it reduces the rate of scale formation in said process.

In at least one embodiment the composition can be added to said liquor at one or more locations in a Bayer process where it facilitates red mud clarification in the process.

In at least one embodiment the composition can be added in combination with or according to any of the compositions and methods disclosed in commonly owned and at least partially co-invented co-pending patent application having a title of "THE RECOVERY OF ALUMINA TRIHYDRATE DURING THE BAYER PROCESS USING CROSS-LINKED POLYSACCHARIDES."

EXAMPLES

The foregoing may be better understood by reference to the following examples, which are presented for purposes of illustration and are not intended to limit the scope of the invention.

Within the examples given below a range of solutions containing scleroglucan and dextran in various ratios were used. The performance of these blends was compared to the performance of scleroglucan and/or dextran when used alone. The compositions of the combined formulations tested are given in table 1. When doses of such blends are quoted, this refers to the combined amount of scleroglucan plus dextran added to the process.

TABLE 1

Ratio of components in blended formulations used within the examples

| Formulation | Ratio of Scleroglucan:Dextran |
|---|---|
| (I) | 1:7 |
| (II) | 8:7 |
| (III) | 1:6 |
| (IV) | 2:5 |

Example 1

Secondary thickener (ST) overflow from an operating Bayer plant was collected just prior to the test, divided into 1

L aliquots in clear 1 L measuring cylinders and placed in a waterbath at 75° C. Each cylinder contained approximately 83 g/L of alumina trihydrate. The products tested were added as dilute solutions one after another to the surface of the slurry and mixed well using a gang plunger. The settling rate was measured by recording the time taken for the solids interface to reach the 600 mL mark of the cylinder from when the mixing ceased. The result of the settling rate is converted to meters per hour (m/hr) in Table 2.

TABLE 2

Alumina trihydrate settling results for Example 1.

| Formulation | Dose (ppm) | Settling Rate (m/hr) |
|---|---|---|
| Dextran | 0.7 | 2.46 |
| Scleroglucan | 0.7 | 3.94 |

The data in table 2 indicate that a significantly faster settling rate can be achieved with scleroglucan as the flocculant compared to an equivalent dose of dextran.

Example 2

The same method as that used in example 1 was employed. The only difference was the solids content of this slurry collected was 45 g/L. After settling the samples were left to settle for 15 minutes followed by removal of 50 mL of slurry from the surface of the slurry using a syringe. This aliquot was filtered through a pre-weighed Supor®-450 membrane filter paper. Solids were then washed with hot deionized water and dried at 100° C. The filter paper and solids were then reweighed and the mass of solids calculated. This mass is listed as "overflow solids (g/L)" in Table 3. The results are displayed in Table 3 and again show the increase in settling rate when scleroglucan is used or included in combination with dextran in a formulation. Additionally, superior (lower) overflow solids are observed when scleroglucan or formulations containing scleroglucan are used.

TABLE 3

Alumina trihydrate settling results for Example 2.

| Formulation | Dose (ppm) | Settling Rate (m/hr) | Overflow Solids (g/L) |
|---|---|---|---|
| Dextran | 0.7 | 4.86 | 0.80 |
| Scleroglucan | 0.7 | 5.40 | 0.78 |
| (I) | 0.8 | 6.57 | 0.71 |

Example 3

The same method as in example 2 was used. The solids content of the slurry collected for this test was 67 g/L.

TABLE 4

Alumina trihydrate settling results for Example 3.

| Formulation | Dose (ppm) | Settling Rate (m/hr) | Overflow Solids (g/L) |
|---|---|---|---|
| Dextran | 0.7 | 4.26 | 0.76 |
| (I) | 0.8 | 5.28 | 0.70 |

Example 4

The same method as in example 2 was used. Two separate sets of data were collected in two experimental runs. The solids content of the slurry for the individual runs in this example was 79 g/L in both cases. The top 50 mL of the slurry was sampled after 10 minutes of settling instead of 15 minutes as in example 2.

TABLE 5

Alumina trihydrate settling results for Example 4 run 1

| Formulation | Dose (ppm) | Settling Rate (m/hr) | Overflow Solids (g/L) |
|---|---|---|---|
| Dextran | 0.7 | 3.47 | 0.78 |
| Dextran | 0.7 | 3.63 | 0.87 |
| (I) | 0.64 | 4.42 | 0.87 |
| (I) | 0.8 | 4.58 | 0.89 |

TABLE 6

Alumina trihydrate settling results for Example 4 run 2

| Formulation | Dose (ppm) | Settling Rate (m/hr) | Overflow Solids (g/L) |
|---|---|---|---|
| Dextran | 0.35 | 3.33 | 1.17 |
| Dextran | 0.7 | 4.54 | 1.01 |
| (II) | 0.38 | 5.65 | 1.03 |
| (II) | 0.75 | 7.97 | 0.67 |

Example 5

Bayer plant spent liquor (200 mL) and air dried plant seed (16 g) was combined in a bottle and heated to 65° C. in a rotating water bath. Once the slurry had reached equilibrium it was transferred to a 250 mL measuring cylinder that was suspended in a water bath at 65° C. The slurry was then dosed with product, mixed thoroughly and allowed to settle for three minutes followed by removal of 50 mL of slurry from the surface of the slurry using a syringe. This aliquot was filtered through a pre-weighed Supor®-450 membrane filter paper. Solids were then washed with hot deionized water and dried at 100° C. The filter paper and solids were then reweighed and the mass of solids calculated. This mass is listed as "overflow solids (g/L)" in Table 7.

TABLE 7

Alumina trihydrate settling results for Example 5.

| Treatment | Dose (ppm) | Overflow Solids (g/L) |
|---|---|---|
| Undosed | 0 | 1.98 |
| Dextran | 0.35 | 1.17 |
| Dextran | 0.70 | 1.04 |
| (I) | 0.40 | 1.10 |
| (I) | 0.80 | 0.86 |

Example 6

The same method as in example 5 was used in this example except that 500 ml of liquor and 40 g of seed was used for each treatment. The sampling of the slurry was conducted after 5 minutes of settling time. The settling rate was measured by the time taken for the solid interface to reach the 350 mL graduation on the cylinder once mixing had ceased.

TABLE 8

Alumina trihydrate settling results of Example 6.

| Treatment | Dose (ppm) | Settling Rate (m/hr) | Overflow Solids (g/L) |
|---|---|---|---|
| Untreated | 0 | 1.04 | 4.41 |
| Dextran | 0.7 | 1.29 | 2.71 |
| (I) | 0.7 | 1.57 | 2.71 |
| (II) | 0.7 | 2.05 | 2.51 |

Example 7

The same method as in example 6 was used except the solids content of the slurry in this example was increased to 120 g/L.

TABLE 9

Alumina trihydrate settling results for Example 7.

| Treatment | Dose (ppm) | Settling Rate (m/hr) | Overflow Solids (g/L) |
|---|---|---|---|
| Untreated | 0 | 0.84 | 4.97 |
| Dextran | 0.7 | 1.45 | 2.79 |
| Dextran | 1.4 | 1.59 | 2.50 |
| (I) | 0.7 | 1.58 | 2.78 |
| (I) | 1.4 | 1.94 | 1.86 |
| (III) | 0.7 | 1.56 | 2.59 |
| (III) | 1.4 | 1.80 | 1.89 |
| (IV) | 0.7 | 1.73 | 2.57 |
| (IV) | 1.4 | 2.14 | 1.91 |
| Scleroglucan | 0.7 | 1.99 | 2.01 |
| Scleroglucan | 1.4 | 2.48 | 1.39 |

Example 8

Plant spent liquor (1 L) and air dried plant seed (80 g) was combined in a bottle and heated to 65° C. in a rotating water bath. Once equilibrium was established the slurry was dosed with flocculant (as appropriate) mixed well and poured into a 1 L Imhoff cone. The slurry was allowed to settle in the cone for twenty minutes before allowing the slurry to discharge through the bottom hole. The discharge time was measured from when the plug was removed after the twenty minutes of settling to when all the contents of the cone had been discharged.

TABLE 10

Example 8 discharge times for settled alumina trihydrate slurries using Imhoff cones.

| Treatment | Dose (ppm) | Imhoff Cone discharge time (seconds) |
|---|---|---|
| Untreated | 0 | 66 |
| Dextran | 0.7 | 31 |
| Scleroglucan | 0.7 | 30 |
| (I) | 0.4 | 33 |

Example 9

The same method as in example 8 was used but the slurry in this example was plant secondary classification overflow slurry collected from the plant just prior to the test. The solids content of this slurry was 62 g/L.

TABLE 11

Example 9 discharge times for settled alumina trihydrate slurries using Imhoff cones.

| Treatment | Dose (ppm) | Imhoff Cone discharge time (seconds) |
|---|---|---|
| Untreated | 0 | 136 |
| Dextran | 0.7 | 40 |
| Scleroglucan | 0.7 | 11 |
| (I) | 0.8 | 23 |

Example 10

The same method as in example 9 was used in this example. The solids content of this slurry was 100 g/L.

TABLE 12

Example 10 discharge times for settled alumina trihydrate slurries using Imhoff cones.

| Treatment | Dose (ppm) | Imhoff Cone discharge time (seconds) |
|---|---|---|
| Untreated | 0 | 127 |
| Dextran | 0.7 | 114 |
| (I) | 0.8 | 112 |

The results from examples 8, 9 and 10 indicate that scleroglucan has an unexpected impact on the flow of settled alumina trihydrate solids.

When applied at the same dose rates as dextran, scleroglucan provides a faster settling rate, more desirable rheological properties in the settled bed and maintains similar or better performance in overflow clarity. The use of scleroglucan is effective when applied either alone, or as a blend with other polysaccharides such as dextran.

While this invention may be embodied in many different forms, there are shown in the drawings and described in detail herein specific preferred embodiments of the invention. The present disclosure is an exemplification of the background and principles of the invention and is not intended to limit the invention to the particular embodiments illustrated. All patents, patent applications, scientific papers, and any other referenced materials mentioned anywhere herein, are incorporated by reference in their entirety. Furthermore, the invention encompasses any possible combination of some or all of the various embodiments described herein and incorporated herein.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

All ranges and parameters disclosed herein are understood to encompass any and all subranges subsumed therein, and every number between the endpoints. For example, a stated range of "1 to 10" should be considered to include any and all subranges between (and inclusive of) the minimum value of 1 and the maximum value of 10; that is, all subranges beginning with a minimum value of 1 or more, (e.g. 1 to 6.1), and ending with a maximum value of 10 or less, (e.g. 2.3 to 9.4, 3 to 8, 4 to 7), and finally to each number 1, 2, 3, 4, 5, 6, 7, 8, 9, and 10 contained within the range.

This completes the description of the preferred and alternate embodiments of the invention. Those skilled in the art may recognize other equivalents to the specific embodiment described herein which equivalents are intended to be encompassed by the claims attached hereto.

The invention claimed is:

1. A composition comprising: scleroglucan and Bayer liquor.

2. The composition of claim 1, wherein the scleroglucan is present at a concentration of 0.1 to 100 ppm.

3. The composition of claim 1, wherein the scleroglucan is present at a concentration of 0.1 to 10 ppm.

4. The composition of claim 1, wherein the composition further comprises a polysaccharide.

5. The composition of claim 4, wherein the polysaccharide is dextran.

6. The composition of claim 5, wherein the scleroglucan and the dextran are present at a scleroglucan:dextran weight ratio range of 1:7 to 8:7.

7. The composition of claim 1, wherein the composition further comprises at least one solid.

8. The composition of claim 1, wherein the composition further comprises alumina trihydrate crystals.

9. The composition of claim 1, wherein the composition further comprises red mud.

10. A composition consisting essentially of: scleroglucan and Bayer liquor.

* * * * *